US011874384B2

(12) United States Patent
Kido et al.

(10) Patent No.: US 11,874,384 B2
(45) Date of Patent: Jan. 16, 2024

(54) LOCATOR, ACCURACY EVALUATION SYSTEM THEREFOR, AND POSITIONING METHOD

(71) Applicant: Mitsubishi Electric Corporation, Tokyo (JP)

(72) Inventors: Masashi Kido, Tokyo (JP); Tadatomi Ishigami, Tokyo (JP); Masatoshi Fujii, Tokyo (JP); Kohei Fujimoto, Tokyo (JP); Ryusuke Kinoshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 215 days.

(21) Appl. No.: 17/601,308

(22) PCT Filed: May 13, 2019

(86) PCT No.: PCT/JP2019/018893
§ 371 (c)(1),
(2) Date: Oct. 4, 2021

(87) PCT Pub. No.: WO2020/230228
PCT Pub. Date: Nov. 19, 2020

(65) Prior Publication Data
US 2022/0179103 A1 Jun. 9, 2022

(51) Int. Cl.
*G01S 19/48* (2010.01)
*G01C 21/28* (2006.01)

(52) U.S. Cl.
CPC .............. *G01S 19/48* (2013.01); *G01C 21/28* (2013.01)

(58) Field of Classification Search
CPC .......... G01S 19/48; G01S 19/47; G01S 19/49; G01C 21/28; G01C 21/165
See application file for complete search history.

(56) References Cited

U.S. PATENT DOCUMENTS

2012/0232792 A1 9/2012 Ding et al.
2021/0221485 A1* 7/2021 Grunewald Mayer ......................
B63B 79/40

FOREIGN PATENT DOCUMENTS

JP 2009-222438 A 10/2009
JP 2012-63261 A 3/2012
(Continued)

OTHER PUBLICATIONS

International Search Report, issued in PCT/JP2019/018893, PCT/ISA/210, dated Jul. 16, 2019.

*Primary Examiner* — Mary Cheung
(74) *Attorney, Agent, or Firm* — Birch, Stewart, Kolasch & Birch, LLP

(57) ABSTRACT

In a locator, a data synchronization unit calculates an interpolated value for autonomous sensor data which corresponds to a time of latest GNSS data. A complex positioning unit performs complex positioning using the latest GNSS data and the interpolated value for the autonomous sensor data. An autonomous navigation positioning unit performs first autonomous navigation positioning using the interpolated value for the autonomous sensor data, and performs second autonomous navigation positioning using latest autonomous sensor data. A modified amount calculator calculates a modified amount of autonomous navigation positioning, based on a difference between a result of the complex positioning and a result of the first autonomous navigation positioning. An autonomous navigation positioning fix modification unit modifies a result of the second autonomous navigation positioning using the modified amount to calculate a current position.

6 Claims, 11 Drawing Sheets

(56) References Cited

FOREIGN PATENT DOCUMENTS

| JP | 2012-185111 A | 9/2012 |
|---|---|---|
| WO | WO2009/112935 A1 | 9/2009 |

* cited by examiner

F I G. 1
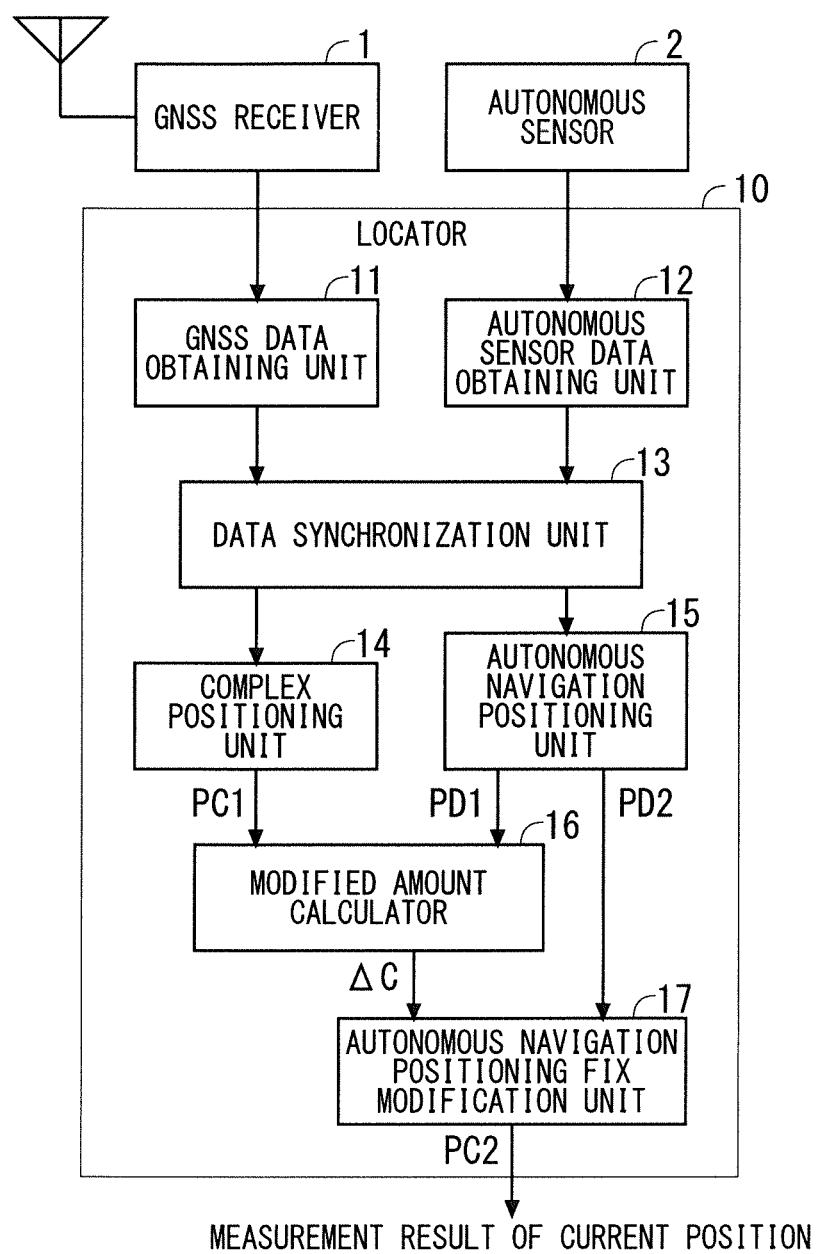

F I G. 8
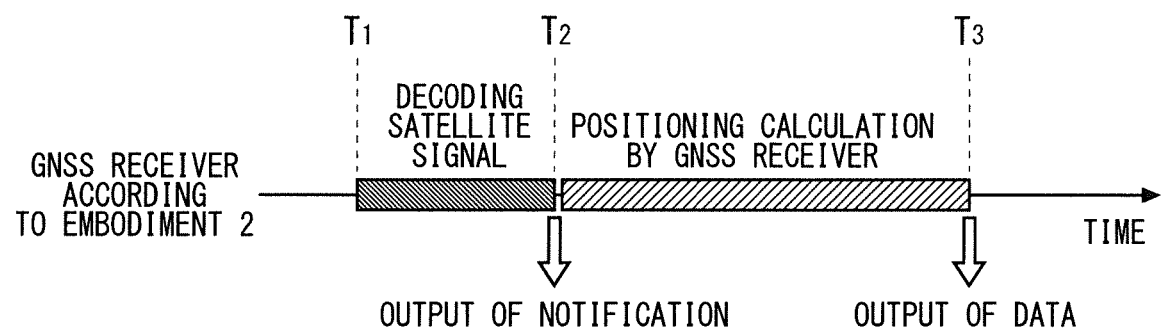

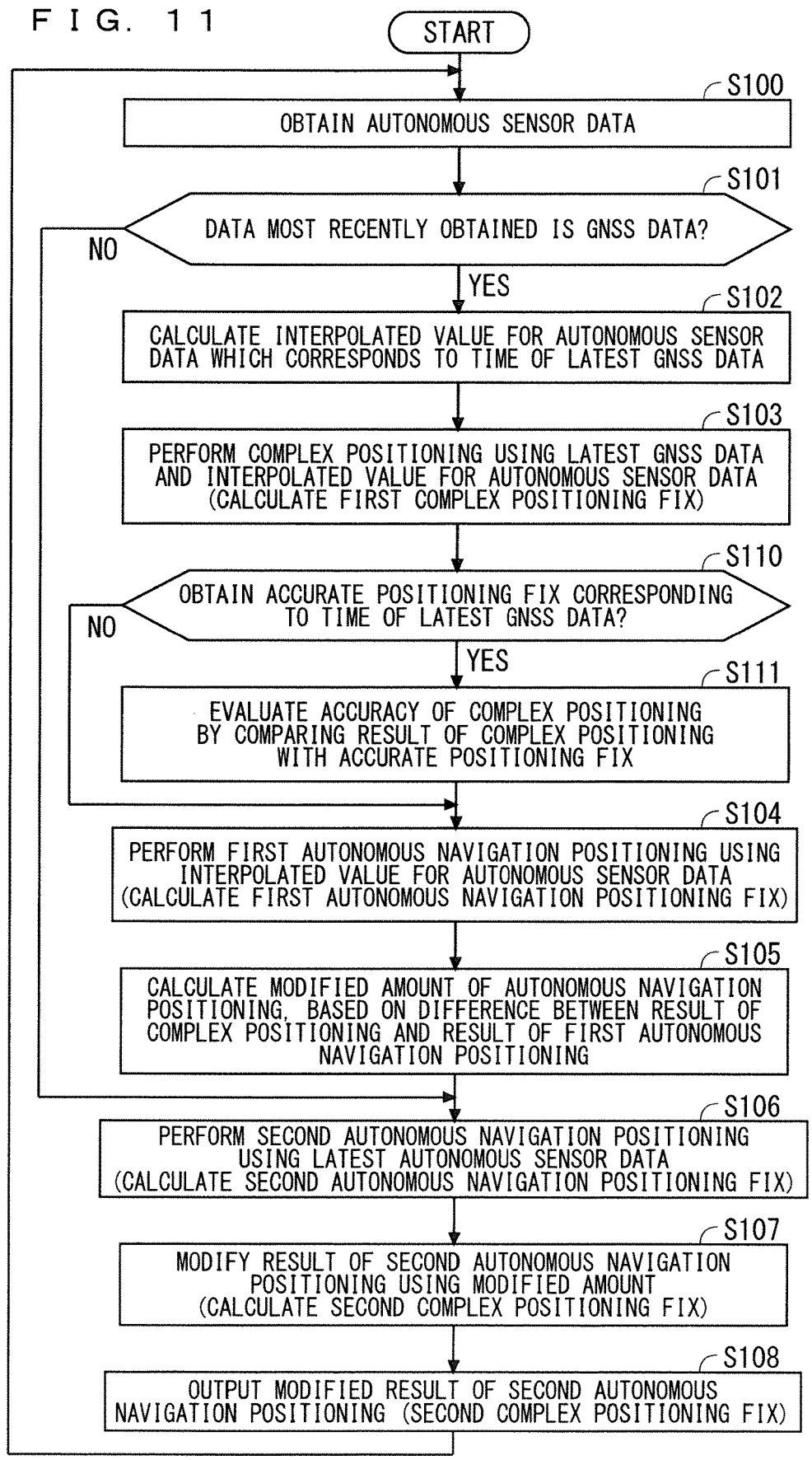

LOCATOR, ACCURACY EVALUATION SYSTEM THEREFOR, AND POSITIONING METHOD

TECHNICAL FIELD

The present invention relates to a locator that measures a current position.

BACKGROUND ART

Known methods for measuring a current position include: Global Navigation Satellite System (GNSS) positioning that is positioning using data received from a GNSS satellite such as a Global Positioning System (GPS) satellite; autonomous navigation positioning that is positioning using data output from an autonomous sensor such as a speed sensor or an azimuth sensor; and complex positioning that is positioning using both of the data received from the GNSS satellite and the data output from the autonomous sensor.

In the DESCRIPTION, data received by a GNSS receiver from a GNSS satellite (i.e., raw data) will be referred to as "GNSS data", and data output by an autonomous sensor will be referred to as "autonomous sensor data". Furthermore, the position obtained as a result of the GNSS positioning will be referred to as a "GNSS positioning fix", the position calculated as a result of the autonomous navigation positioning will be referred to as an "autonomous navigation positioning fix", and the position obtained as a result of the complex positioning will be referred to as a "complex positioning fix".

The complex positioning can be expectedly higher in accuracy than the GNSS positioning and the autonomous navigation positioning. For example, Patent Documents 1 and 2 below each disclose a locator that estimates a position of a vehicle through the complex positioning using data received from a GNSS satellite by a GNSS receiver loaded onto the vehicle, and data output by an autonomous sensor of the vehicle.

Schemes of the complex positioning include: a tightly coupled scheme of calculating a complex positioning fix directly from the GNSS data and the autonomous sensor data; and a loosely coupled scheme of calculating a complex positioning fix from a result of the GNSS positioning (a GNSS positioning fix) and a result of the autonomous navigation positioning (an autonomous navigation positioning fix). Under an environment where satellite signals are satisfactorily captured from GNSS satellites, there is almost no difference between the tightly coupled scheme and the loosely coupled scheme. When the number of the GNSS satellites from which the satellite signals can be captured is less, the accuracy in the tightly coupled scheme is more easily maintained.

Since the GNSS receiver and the autonomous sensor are different pieces of hardware, the time of GNSS data does not normally coincide with the time of autonomous sensor data. The complex positioning using the GNSS data and the autonomous sensor data at different times causes an error in a result of the positioning. The measure against this in Patent Document 1 is to calculate an interpolated value for a GNSS positioning fix which corresponds to the time of the autonomous sensor data, and perform the complex positioning using the autonomous sensor data and the interpolated value for the GNSS positioning fix to correct an error caused by a time difference. The measure in Patent Document 2 is to perform the complex positioning when the time of the GNSS data coincides with the time of the autonomous sensor data, calculate a modified amount by comparing the calculated complex positioning fix with an autonomous navigation positioning fix identical in time to the complex positioning fix, and add the modified amount to an autonomous navigation positioning fix at the current time to correct an error caused by a time difference.

PRIOR ART DOCUMENTS

Patent Documents

[Patent Document 1] Japanese Patent Application Laid-Open No. 2009-222438

[Patent Document 2] Japanese Patent Application Laid-Open No. 2012-185111

SUMMARY

Problem to be Solved by the Invention

Since the GNSS positioning fix (e.g., latitude and longitude) that is a result of the GNSS positioning is interpolated according to the technology of Patent Document 1, the tightly coupled complex positioning cannot be performed. Although interpolating the GNSS data (raw data) enables the tightly coupled complex positioning, the accurate interpolation is difficult. This is because behaviors of the GNSS data are complicated.

As described above, since the GNSS receiver and the autonomous sensor are different pieces of hardware, the time of GNSS data does not normally coincide with the time of autonomous sensor data. Thus, there may be almost no timing at which a corrected amount can be calculated according to the technology of Patent Document 2. In such a case, it is hard to maintain satisfactory accuracy.

The present invention has been conceived to solve the problems, and has an object of providing a locator which improves the accuracy of the complex positioning by reducing an error caused by a time difference between the GNSS data and the autonomous sensor data and which can perform both of the tightly coupled complex positioning and the loosely coupled complex positioning.

Means to Solve the Problem

A locator according to the present invention includes: a GNSS data obtaining unit to obtain GNSS data from a GNSS receiver, the GNSS data being data received by the GNSS receiver from a GNSS satellite; an autonomous sensor data obtaining unit to obtain autonomous sensor data that is data output by an autonomous sensor; a data synchronization unit to calculate an interpolated value for the autonomous sensor data, when the autonomous sensor data obtaining unit obtains the autonomous sensor data after the GNSS data obtaining unit obtains the GNSS data, the interpolated value corresponding to a time of latest GNSS data; a complex positioning unit to perform complex positioning using the latest GNSS data and the interpolated value for the autonomous sensor data; an autonomous navigation positioning unit to perform first autonomous navigation positioning using the interpolated value for the autonomous sensor data, and perform second autonomous navigation positioning using latest autonomous sensor data; a modified amount calculator to calculate a modified amount of autonomous navigation positioning, based on a difference between a first complex positioning fix that is a result of the complex positioning and a first autonomous navigation positioning fix that is a result of the first autonomous navigation positioning; and an autonomous navigation positioning fix modification unit to modify, using the modified amount, a second autonomous navigation positioning fix that is a result of the second autonomous navigation positioning to calculate a second complex positioning fix, and output the second complex positioning fix as a measurement result of a current position.

Effects of the Invention

The locator according to the present invention calculates the modified amount of the autonomous navigation positioning based on a difference between the first complex positioning fix that is calculated using the interpolated value for the autonomous sensor data and the first autonomous navigation positioning fix, and modifies, using the modified amount, the second autonomous navigation positioning fix that is the latest autonomous navigation positioning fix to calculate the second complex positioning fix as a measurement result of the current position. This reduces, in the measurement result of the current position, an error caused by a time difference between the GNSS data and the autonomous sensor data. Since the autonomous sensor data is more stable in behavior than the GNSS data, the autonomous sensor data has an advantage of capability of being accurately interpolated. Since not the result of the autonomous navigation positioning but the autonomous sensor data is interpolated, the locator can perform both of the loosely coupled complex positioning and the tightly coupled complex positioning.

The object, features, aspects and advantages of the present invention will become more apparent from the following detailed description and the accompanying drawings.

BRIEF DESCRIPTION OF DRAWINGS

FIG. 1 illustrates a configuration of a positioning system including a locator according to Embodiment 1.

FIG. 8 illustrates operations of the GNSS receiver according to Embodiment 2.

FIG. 11 is a flowchart for describing operations of the accuracy evaluation system for the locator according to Embodiment 3.

DESCRIPTION OF EMBODIMENTS

Embodiment 1

Figure 2:
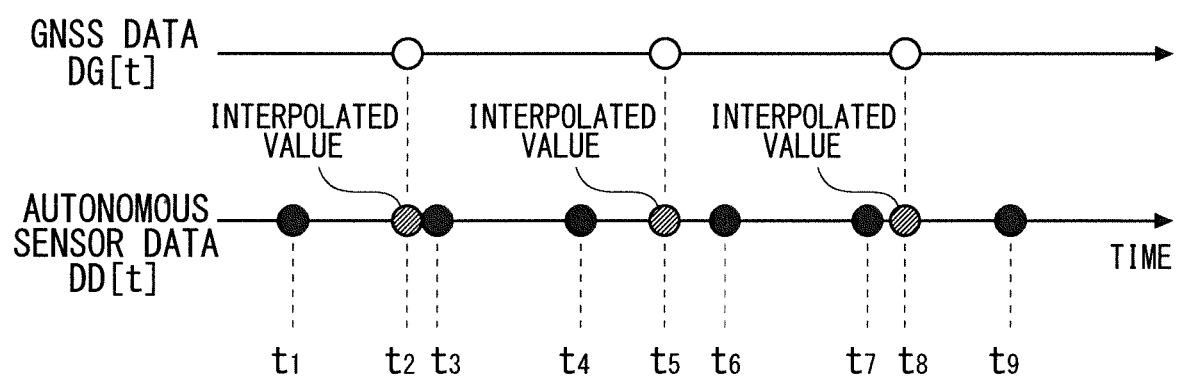
FIG. 2 illustrates operations of a data synchronization unit.

FIG. 1 illustrates a configuration of a positioning system according to Embodiment 1. As illustrated in FIG. 1, the positioning system includes a GNSS receiver 1, an autonomous sensor 2, and a locator 10. The assumption in Embodiment 1 is that the positioning system is loaded onto a vehicle. Hereinafter, the vehicle onto which the positioning system is loaded will be referred to as a "subject vehicle". A part or the entirety of the positioning system need not be always loaded onto the subject vehicle, but may be, for example, constructed in a mobile device such as a mobile phone, a smartphone, or a portable navigation device. Although the configuration of the system shows the locator 10 externally equipped with the GNSS receiver 1 and the autonomous sensor 2, the locator 10 may include the GNSS receiver 1 and the autonomous sensor 2.

The GNSS receiver 1 receives a satellite signal transmitted from a GNSS satellite, decode the satellite signal to retrieve raw data, and output the raw data as GNSS data. The GNSS receiver 1 also has a function of GNSS positioning using the GNSS data, and outputs a GNSS positioning fix that is a result of the GNSS positioning.

Examples of the autonomous sensor 2 include a gyro sensor, an acceleration sensor, and a vehicle speed sensor of the subject vehicle. The autonomous sensor 2 outputs, as the autonomous sensor data, data necessary for the autonomous navigation positioning such as an azimuth (a yaw angle, a roll angle, and a pitch angle) or a speed of the subject vehicle. The autonomous sensor 2 may include other sensors available for the autonomous navigation, such as a camera and a Light Detection and Ranging (LiDAR) sensor.

The locator 10 calculate a current position of the subject vehicle through the complex positioning using the GNSS data output by the GNSS receiver 1 and the autonomous sensor data output by the autonomous sensor 2. As illustrated in FIG. 1, the locator 10 includes a GNSS data obtaining unit 11, an autonomous sensor data obtaining unit 12, a data synchronization unit 13, a complex positioning unit 14, an autonomous navigation positioning unit 15, a modified amount calculator 16, and an autonomous navigation positioning fix modification unit 17. All of the GNSS data obtaining unit 11, the autonomous sensor data obtaining unit 12, the data synchronization unit 13, the complex positioning unit 14, the autonomous navigation positioning unit 15, the modified amount calculator 16, and the autonomous navigation positioning fix modification unit 17 need not be included in the locator 10 but, for example, may partly be constructed in an external server. Constructing a part of the constituent elements of the locator 10 in the server can reduce a computation load on the locator 10.

The GNSS data obtaining unit 11 obtains, from the GNSS receiver 1, the GNSS data that is raw data received by the GNSS receiver 1 from the GNSS satellite, attaches a time stamp representing a time to the GNSS data, and stores the GNSS data. The time of the time stamp attached to the GNSS data is the time at which the GNSS data obtaining unit 11 has obtained the GNSS data in Embodiment 1. The time of the GNSS data may be the time at which the GNSS receiver 1 has started to decode the satellite signal or has completed decoding the satellite signal, which will be described later. The timing at which the GNSS data obtaining unit 11 obtains the GNSS data coincides with when the GNSS receiver 1 transmits the GNSS data. The GNSS data obtaining unit 11 cannot control the timing.

The autonomous sensor data obtaining unit 12 obtains the autonomous sensor data (e.g., a yaw angle, a roll angle, a pitch angle, and a speed of the subject vehicle) output by the autonomous sensor 2, attaches a time stamp representing a time to the autonomous sensor data, and stores the autonomous sensor data. The time of the time stamp attached to the autonomous sensor data is the time at which the autonomous sensor data obtaining unit 12 has obtained the autonomous sensor data in Embodiment 1. The timing at which the autonomous sensor data obtaining unit 12 obtains the autonomous sensor data coincides with when the autonomous sensor 2 transmits the autonomous sensor data. The autonomous sensor data obtaining unit 12 cannot control the timing.

The data synchronization unit 13 monitors operations of the GNSS data obtaining unit 11 and the autonomous sensor data obtaining unit 12, and determines, when the autonomous sensor data obtaining unit 12 obtains the autonomous sensor data, whether the data most recently obtained is the GNSS data or the autonomous sensor data. Here, when the data most recently obtained is the GNSS data, the data synchronization unit 13 calculates, with reference to the time of the time stamp attached to the latest GNSS data, an interpolated value for the autonomous sensor data which corresponds to the time. In other words, when the autonomous sensor data obtaining unit 12 obtains the autonomous sensor data after the GNSS data obtaining unit 11 obtains the GNSS data, the data synchronization unit 13 calculates an interpolated value for the autonomous sensor data which corresponds to the time of the latest GNSS data. The method for interpolating the autonomous sensor data may be any method, for example, a known interpolation method such as spline interpolation or linear interpolation.

For example, when the autonomous sensor data DD $[t_1]$ is obtained at a time $t_1$, the GNSS data DG $[t_2]$ is obtained subsequently at a time $t_2$, and then the autonomous sensor data DD $[t3]$ is obtained at a time $t_3$ as illustrated in FIG. 2, the data synchronization unit 13 calculates, at the time $t_3$, an interpolated value DD $[t_2]$ for the autonomous sensor data which corresponds to the time $t_2$ of the latest GNSS data DG $[t_2]$ (hereinafter referred to as autonomous sensor data DD $[t_2]$ (an interpolated value)).

Even when the autonomous sensor data DD $[t_4]$ is obtained subsequently at a time $t_4$, the data most recently obtained is not the GNSS data but the autonomous sensor data DD $[t_3]$. Thus, the interpolation process for the autonomous sensor data is not performed at the time $t_4$.

Next, when the GNSS data DG $[t_5]$ is obtained at a time $t_5$ and the autonomous sensor data DD $[t_6]$ is obtained subsequently at a time $t_6$, the data synchronization unit 13 calculates, at the time $t_6$, an interpolated value DD $[t_5]$ for the autonomous sensor data which corresponds to the time $t_5$ of the latest GNSS data DG $[t_5]$ (hereinafter referred to as autonomous sensor data DD $[t_5]$ (an interpolated value)).

Similarly, even when the autonomous sensor data DD $[t_7]$ is obtained subsequently at a time $t_7$, the data most recently obtained is not the GNSS data but the autonomous sensor data DD $[t_6]$. Thus, the interpolation process for the autonomous sensor data is not performed at the time $t_7$.

Next, when the GNSS data DG $[t_8]$ is obtained at a time $t_8$ and the autonomous sensor data DD $[t_9]$ is obtained subsequently at a time $t_9$, the data synchronization unit 13 calculates, at the time $t_9$, an interpolated value DD $[t_8]$ for the autonomous sensor data which corresponds to the time $t_8$ of the latest GNSS data DG $[t_8]$ (hereinafter referred to as autonomous sensor data DD $[t_8]$ (an interpolated value)).

Referring back to FIG. 1, when the data synchronization unit 13 calculates an interpolated value for the autonomous sensor data, the complex positioning unit 14 performs complex positioning using the latest GNSS data and the interpolated value for the autonomous sensor data which corresponds to the time of the GNSS data. The complex positioning unit 14 may perform this complex positioning in the tightly coupled scheme of calculating a complex positioning fix directly from the GNSS data and the interpolated value for the autonomous sensor data, or in the loosely coupled scheme of calculating a complex positioning fix from a result of the GNSS positioning using the GNSS data (a GNSS positioning fix) and a result of the autonomous navigation positioning using the interpolated value for the autonomous sensor data (an autonomous navigation positioning fix). The complex positioning fix calculated by the complex positioning unit 14 will be referred to as a "first complex positioning fix".

When the complex positioning unit 14 performs tightly coupled complex positioning, the data synchronization unit 13 needs to interpolate the autonomous sensor data itself (e.g., a yaw angle, a roll angle, a pitch angle, or a traveling speed of the subject vehicle) obtained by the autonomous sensor data obtaining unit 12. In contrast, when the complex positioning unit 14 performs loosely coupled complex positioning, the data synchronization unit 13 may interpolate data on the position and the azimuth of the subject vehicle that are calculated from the autonomous sensor data.

Figure 3:
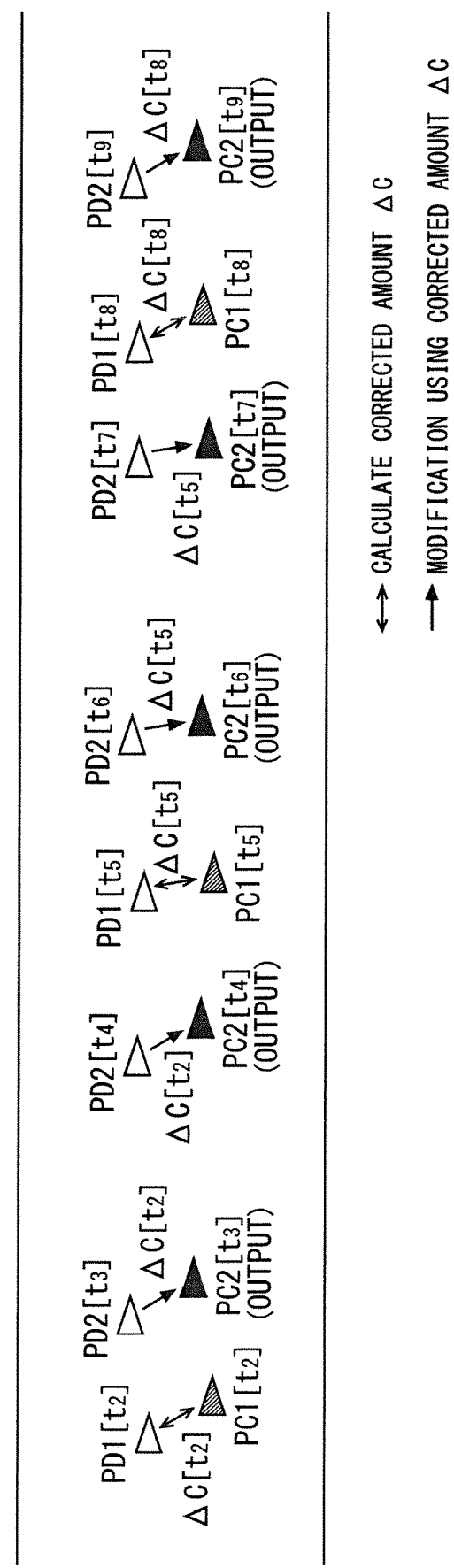
FIG. 3 illustrates operations of a complex positioning unit, an autonomous navigation positioning unit, a modified amount calculator, and an autonomous navigation positioning fix modification unit.

In the example of FIG. 2, the complex positioning unit 14 performs the complex positioning using the GNSS data DG $[t_2]$ and the autonomous sensor data DD $[t_2]$ (interpolated value) at the time $t_3$ to calculate the first complex positioning fix PC1 $[t_2]$ illustrated in FIG. 3. Furthermore, the complex positioning unit 14 performs the complex positioning using the GNSS data DG $[t_5]$ and the autonomous sensor data DD $[t_5]$ (interpolated value) at the time $t_6$ to calculate the first complex positioning fix PC1 $[t_5]$ illustrated in FIG. 3. Furthermore, the complex positioning unit 14 performs the complex positioning using the GNSS data DG $[t_8]$ and the autonomous sensor data DD $[t_8]$ (interpolated value) at the time $t_9$ to calculate the first complex positioning fix PC1 $[t_8]$ illustrated in FIG. 3.

The autonomous navigation positioning unit 15 performs the first autonomous navigation positioning using the interpolated value for the autonomous sensor data which has been calculated by the data synchronization unit 13, and performs the second autonomous navigation positioning using the latest autonomous sensor data obtained by the autonomous sensor data obtaining unit 12. Hereinafter, the autonomous navigation positioning fix calculated by the first autonomous navigation positioning will be referred to as the "first autonomous navigation positioning fix", and the autonomous navigation positioning fix calculated by the second autonomous navigation positioning will be referred to as the "second autonomous navigation positioning fix".

In the example of FIG. 2, the autonomous navigation positioning unit 15 performs the first autonomous navigation positioning using the autonomous sensor data DD $[t_2]$ (interpolated value) and the second autonomous navigation positioning using the latest autonomous sensor data DD $[t_3]$ at the time $t_3$ to calculate the first autonomous navigation positioning fix PD1 $[t_2]$ and the second autonomous navigation positioning fix PD2 $[t_3]$ that are illustrated in FIG. 3. Furthermore, the autonomous navigation positioning unit 15 performs the second autonomous navigation positioning using the latest autonomous sensor data DD $[t_4]$ at the time $t_4$ to calculate the second autonomous navigation positioning fix PD2 $[t_4]$ illustrated in FIG. 3. Furthermore, the autonomous navigation positioning unit 15 performs the first autonomous navigation positioning using the autonomous sensor data DD $[t_5]$ (interpolated value) and the second autonomous navigation positioning using the latest autonomous sensor data DD $[t_6]$ at the time $t_6$ to calculate the first autonomous navigation positioning fix PD1 $[t_5]$ and the second autonomous navigation positioning fix PD2 [$t_6$] that are illustrated in FIG. 3. Furthermore, the autonomous navigation positioning unit 15 performs the second autonomous navigation positioning using the latest autonomous sensor data DD [$t_7$] at the time $t_7$ to calculate the second autonomous navigation positioning fix PD2 [$t_7$] illustrated in FIG. 3. Furthermore, the autonomous navigation positioning unit 15 performs the first autonomous navigation positioning using the autonomous sensor data DD [$t_8$] (interpolated value) and the second autonomous navigation positioning using the latest autonomous sensor data DD [$t_9$] at the time $t_9$ to calculate the first autonomous navigation positioning fix PD1 [$t_8$] and the second autonomous navigation positioning fix PD2 [$t_9$] that are illustrated in FIG. 3.

The modified amount calculator 16 calculates a modified amount of autonomous navigation positioning, based on a difference between the first complex positioning fix that is a result of the complex positioning by the complex positioning unit 14 and the first autonomous navigation positioning fix that is a result of the first autonomous navigation positioning by the autonomous navigation positioning unit 15.

In the example of FIG. 2, the modified amount calculator 16 calculates, as a modified amount ΔC [$t_2$] at the time $t_3$, a difference between the first complex positioning fix PC1 [$t_2$] and the first autonomous navigation positioning fix PD1 [$t_2$] that are illustrated in FIG. 3. Furthermore, the modified amount calculator 16 calculates, as a modified amount ΔC [t5] at the time $t_6$, a difference between the first complex positioning fix PC1 [$t_5$] and the first autonomous navigation positioning fix PD1 [$t_5$] that are illustrated in FIG. 3. Furthermore, the modified amount calculator 16 calculates, as a modified amount ΔC [$t_8$] at the time $t_9$, a difference between the first complex positioning fix PC1 [$t_8$] and the first autonomous navigation positioning fix PD1 [$t_8$] that are illustrated in FIG. 3.

The autonomous navigation positioning fix modification unit 17 modifies the second autonomous navigation positioning fix that is a result of the second autonomous navigation positioning, using the latest modified amount calculated by the modified amount calculator 16 to calculate the second complex positioning fix. The locator 10 outputs the second complex positioning fix calculated by the autonomous navigation positioning fix modification unit 17 as a measurement result of the current position of the subject vehicle.

In the example of FIG. 2, the autonomous navigation positioning fix modification unit 17 adds the modified amount ΔC [$t_2$] to the second autonomous navigation positioning fix PD2 [$t_3$] in FIG. 3 to calculate the second complex positioning fix PC2 [$t_3$] at the time $t_3$. Furthermore, the autonomous navigation positioning fix modification unit 17 adds the modified amount ΔC [$t_2$] to the second autonomous navigation positioning fix PD2 [$t_4$] in FIG. 3 to calculate the second complex positioning fix PC2 [$t_4$] at the time $t_4$. Furthermore, the autonomous navigation positioning fix modification unit 17 adds the modified amount ΔC [$t_5$] to the second autonomous navigation positioning fix PD2 [$t_6$] in FIG. 3 to calculate the second complex positioning fix PC2 [$t_6$] at the time $t_6$. Furthermore, the autonomous navigation positioning fix modification unit 17 adds the modified amount ΔC [$t_5$] to the second autonomous navigation positioning fix PD2 [$t_7$] in FIG. 3 to calculate the second complex positioning fix PC2 [$t_7$] at the time $t_7$. Furthermore, the autonomous navigation positioning fix modification unit 17 adds the modified amount ΔC [$t_8$] to the second autonomous navigation positioning fix PD2 [$t_9$] in FIG. 3 to calculate the second complex positioning fix PC2 [$t_9$] at the time $t_9$.

Thus, the locator 10 outputs the second complex positioning fixes PC2 [$t_3$], PC2 [$t_4$], PC2 [$t_6$], PC2 [$t_7$], and PC2 [$t_9$] as measurement results of the current positions at the times $t_3$, $t_4$, $t_6$, $t_7$, and $t_9$, respectively. As seen from FIG. 2, the times $t_3$, $t_4$, $t_6$, $t_7$, and $t_9$ are the timings at which the autonomous sensor data DD [t] is obtained. Thus, the locator 10 operates based on the time axis of the autonomous sensor 2.

Consequently, the locator 10 according to Embodiment 1 calculates the modified amount of the autonomous navigation positioning based on a difference between the first complex positioning fix (PC1) calculated using the interpolated value for the autonomous sensor data and the first autonomous navigation positioning fix (PD1), and modifies, using the modified amount, the second autonomous navigation positioning fix (PD2) that is the latest autonomous navigation positioning fix to calculate the second complex positioning fix (PC2) as a measurement result of the current position. This reduces, in the measurement result of the current position, an error caused by a time difference between the GNSS data and the autonomous sensor data. Since the autonomous sensor data is more stable in behavior than the GNSS data, the autonomous sensor data has an advantage of capability of being accurately interpolated. Since not the result of the autonomous navigation positioning but the autonomous sensor data is interpolated, the locator 10 can perform both of the loosely coupled complex positioning and the tightly coupled complex positioning.

Figure 4:
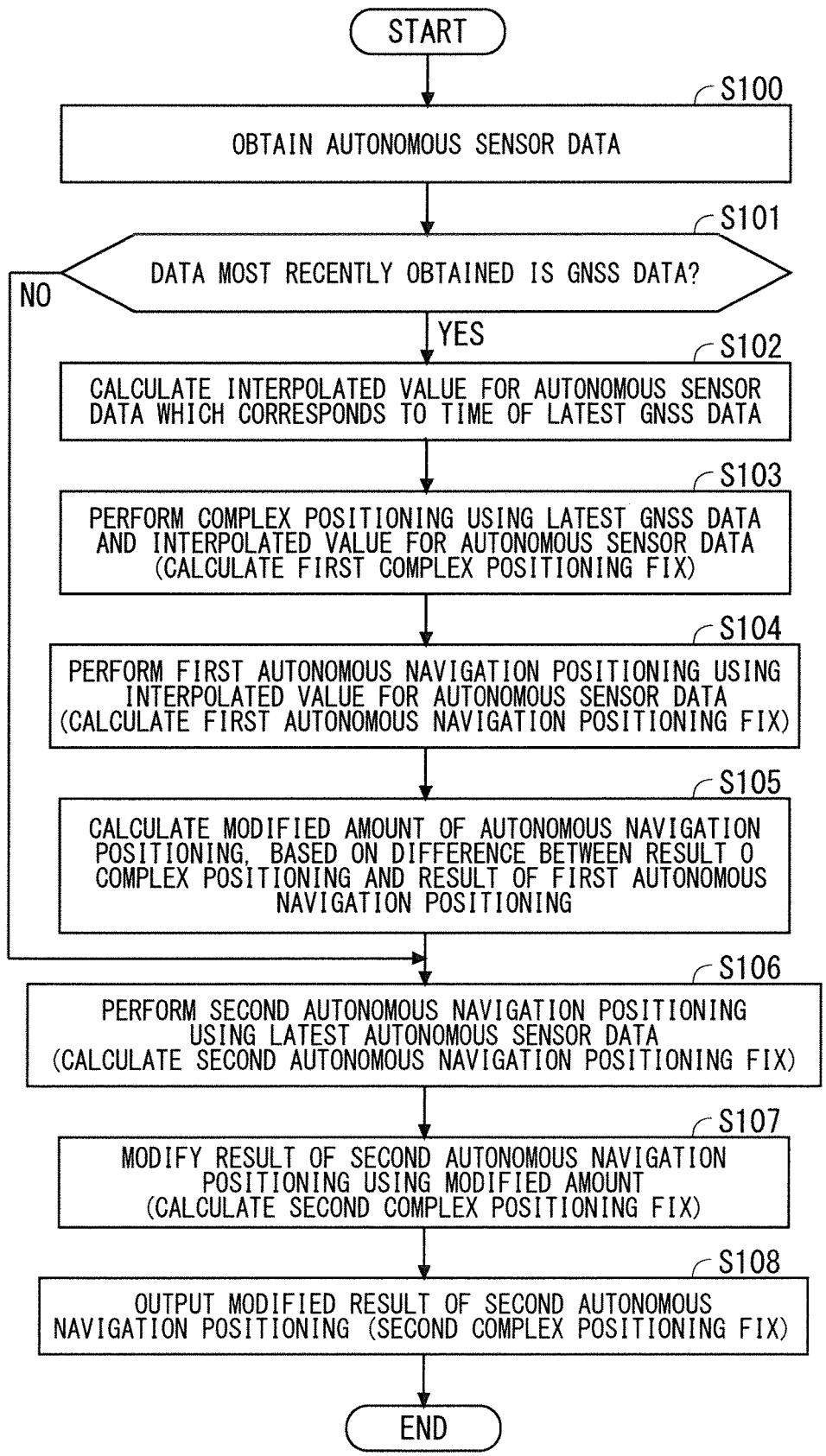
FIG. 4 is a flowchart for describing operations of the locator according to Embodiment 1.

Next, operations according to Embodiment 1 will be described with reference to the flowchart of FIG. 4. The GNSS data obtaining unit 11 obtains the GNSS data at any timing of outputting the GNSS data by the GNSS receiver 1, which is not illustrated in the flowchart of FIG. 4.

Once the locator 10 is started and the autonomous sensor data obtaining unit 12 obtains the autonomous sensor data (Step S100), the data synchronization unit 13 checks whether data most recently obtained by each of the GNSS data obtaining unit 11 and the autonomous sensor data obtaining unit 12 is the GNSS data (Step S101).

When the data most recently obtained by each of the GNSS data obtaining unit 11 and the autonomous sensor data obtaining unit 12 is the GNSS data (YES in Step S101), the data synchronization unit 13 calculates an interpolated value for the autonomous sensor data which corresponds to the time of the latest GNSS data (Step S102). Next, the complex positioning unit 14 performs the complex positioning using the latest GNSS data and the interpolated value for the autonomous sensor data to calculate the first complex positioning fix (PC1) corresponding to the time of the latest GNSS data (Step S103). Furthermore, the autonomous navigation positioning unit 15 performs the first autonomous navigation positioning using the interpolated value for the autonomous sensor data to calculate the first autonomous navigation positioning fix (PD1) corresponding to the time of the latest GNSS data (Step S104). Then, the modified amount calculator 16 calculates a modified amount (ΔC) of autonomous navigation positioning, based on a difference between the first complex positioning fix (PC1) calculated in Step S103 and the first autonomous navigation positioning fix calculated in Step S104 (Step S105).

Next, the autonomous navigation positioning unit 15 performs the second autonomous navigation positioning using the latest autonomous sensor data obtained in Step S101 to calculate the second autonomous navigation positioning fix (PD2) corresponding to the current time (Step S106). Afterward, the autonomous navigation positioning fix modification unit 17 modifies the second autonomous navigation positioning fix (PD2) using the modified amount calculated in Step S105 to calculate the second complex positioning fix (PC2) from which the error caused by the time difference between the GNSS data and the autonomous sensor data has been eliminated (Step S107). Then, the autonomous navigation positioning fix modification unit 17 outputs the second complex positioning fix (PC2) as a measurement result of the current position of the subject vehicle from the locator 10 (Step S108).

When the data most recently obtained by each of the GNSS data obtaining unit 11 and the autonomous sensor data obtaining unit 12 is the autonomous sensor data (No in Step S101), Steps S102 to S105 are not performed, and the processes proceed to Step S106. Here, a value of the modified amount ($\Delta C$) of the autonomous navigation positioning is not updated (i.e., the value of the modified amount ($\Delta C$) most recently calculated in Step S103 is maintained). Thus, in the example of FIG. 3, for example, the modified amount to be added to the second autonomous navigation positioning fix PD2 [$t_4$] corresponding to the time $t_4$ is identical to the corrected amount to be added to the second autonomous navigation positioning fix PD2 [$t_3$] corresponding to the time t3 (both of the modified amounts are the modified amount $\Delta C$ [$t_2$]).

The locator 10 repeatedly executes the processes of Steps S100 to S108. For example, when the processing load on the locator 10 needs to be reduced, processes of reducing the processing load on the locator 10 such as automatically reducing a period for obtaining the GNSS data or the autonomous sensor data (an execution period of Step S101) and reducing the frequency of updating the modified amount (an execution frequency of Steps S102 to S105) may be performed.

Although only the calculation of the position of the subject vehicle is described above, the locator 10 performs, for example, a process of eliminating the error caused by a time difference between the GNSS data and the autonomous sensor data similarly on data other than the position of the subject vehicle, such as the altitude, the azimuth, and an amount of lateral movement.

Application of the measurement result of the current position of the subject vehicle to be output by the locator 10 will be described below.

Since the situation around the subject vehicle needs to be understood in the automated driving control of the vehicle, sensors including a camera and a millimeter wave radar are used. The locator 10 can be used as one of such sensors. For example, checking information on the current position of the subject vehicle output by the locator 10 with accurate map information enables accurate identification of the position and a target path of the subject vehicle even in an environment where normal operation of the camera is difficult (e.g., glare, heavy rain, or dense fog), and enables the subject vehicle to continue the automated driving.

Furthermore, a car navigation system of the subject vehicle can provide route guidance on a per lane basis, using the position of the subject vehicle identified by the locator 10 and the accurate map information. Specifically, when the subject vehicle is not traveling in an appropriate lane, guiding a lane change to an appropriate lane is possible. Furthermore, whether the subject vehicle is traveling in a lane in opposite direction is determined. If the subject vehicle is traveling in the opposite direction, an alert can be issued.

In recent years, Augmented Reality (AR) technology has been developed. The AR technology is, for example, superimposing additional information on an actual landscape around the subject vehicle and displaying the resulting image using a display that displays an image on a screen through which the driver can see the image, such as a head-up display. Accurately determining the position of the subject vehicle is important to enhance the reliability of such technology. For example, when the head-up display superimposes an AR image on a landscape around the subject vehicle and displays the image, an error in the position of the subject vehicle which is recognized by the head-up display displaces the display position of the AR image on the landscape, and impairs visibility of the AR image. Since application of the position of the subject vehicle identified by the locator 10 and the accurate map information enables accurate identification of the position of the subject vehicle, the application can contribute to enhancement of the reliability of the AR technology.

Figure 5:
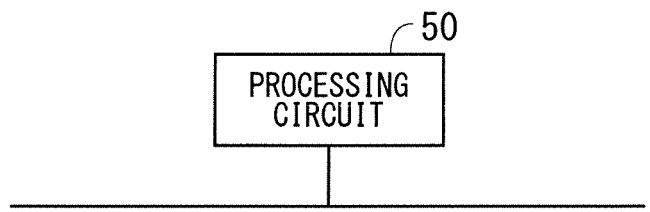
FIG. 5 illustrates an example hardware configuration of the locator.
Figure 6:
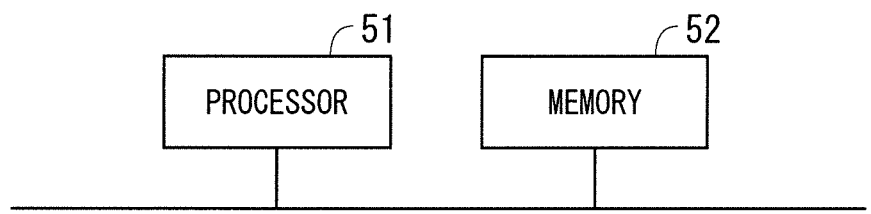
FIG. 6 illustrates an example hardware configuration of the locator.

FIGS. 5 and 6 each illustrate an example hardware configuration of the locator 10. The functions of the constituent elements of the locator 10 illustrated in FIG. 1 are implemented by, for example, a processing circuit 50 illustrated in FIG. 5. Specifically, the locator 10 includes the processing circuit 50 for: obtaining GNSS data from the GNSS receiver 1, the GNSS data being data received by the GNSS receiver 1 from a GNSS satellite; obtaining autonomous sensor data that is data output by the autonomous sensor 2; calculating an interpolated value for the autonomous sensor data, when obtaining the autonomous sensor data after obtaining the GNSS data, the interpolated value corresponding to a time of latest GNSS data; performing complex positioning using the latest GNSS data and the interpolated value for the autonomous sensor data; performing first autonomous navigation positioning using the interpolated value for the autonomous sensor data, and performing second autonomous navigation positioning using latest autonomous sensor data; calculating a modified amount of autonomous navigation positioning, based on a difference between a first complex positioning fix that is a result of the complex positioning and a first autonomous navigation positioning fix that is a result of the first autonomous navigation positioning; and modifying, using the modified amount, a second autonomous navigation positioning fix that is a result of the second autonomous navigation positioning to calculate a second complex positioning fix, and outputting the second complex positioning fix as a measurement result of a current position. The processing circuit 50 may be dedicated hardware, or a processor (also referred to as a central processing unit (CPU)), a processing unit, an arithmetic unit, a microprocessor, a microcomputer, or a digital signal processor (DSP)) which executes a program stored in a memory.

When the processing circuit 50 is dedicated hardware, the processing circuit 50 is, for example, a single circuit, a composite circuit, a programmed processor, a parallel-programmed processor, an Application Specific Integrated Circuit (ASIC), a Field-Programmable Gate Array (FPGA), or any combination of these. Each function of the constituent elements of the locator 10 may be implemented by a separate processing circuit, or the functions may be collectively implemented by a single processing circuit.

FIG. 6 illustrates an example hardware configuration of the locator 10 when the processing circuit 50 includes a processor 51 that executes a program. Here, the functions of the constituent elements of the locator 10 are implemented by, for example, software (software, firmware, or a combination of the software and the firmware). For example, the software is described as a program, and stored in a memory 52. The processor 51 performs the functions in each of the units by reading and executing the programs stored in the memory. Specifically, the locator 10 includes the memory 52 for storing a program which, when executed by the processor 51, consequently executes the processes of: obtaining GNSS data from the GNSS receiver 1, the GNSS data being data received by the GNSS receiver 1 from a GNSS satellite; obtaining autonomous sensor data that is data output by the autonomous sensor 2; calculating an interpolated value for the autonomous sensor data, when obtaining the autonomous sensor data after obtaining the GNSS data, the interpolated value corresponding to a time of latest GNSS data; performing complex positioning using the latest GNSS data and the interpolated value for the autonomous sensor data; performing first autonomous navigation positioning using the interpolated value for the autonomous sensor data, and performing second autonomous navigation positioning using latest autonomous sensor data; calculating a modified amount of autonomous navigation positioning, based on a difference between a first complex positioning fix that is a result of the complex positioning and a first autonomous navigation positioning fix that is a result of the first autonomous navigation positioning; and modifying, using the modified amount, a second autonomous navigation positioning fix that is a result of the second autonomous navigation positioning to calculate a second complex positioning fix, and outputting the second complex positioning fix as a measurement result of a current position. Put it differently, this program causes a computer to execute procedures or methods of operations of the constituent elements of the locator 10.

Here, examples of the memory 52 may include non-volatile or volatile semiconductor memories such as a Random Access Memory (RAM), a Read Only Memory (ROM), a flash memory, an Erasable Programmable Read Only Memory (EPROM), an Electrically Erasable Programmable Read Only Memory (EEPROM), a Hard Disk Drive (HDD), a magnetic disc, a flexible disk, an optical disk, a compact disk, a mini disk, a Digital Versatile Disc (DVD), a drive device thereof, and further any storage medium to be used in the future.

The configuration for implementing the functions of the constituent elements of the locator 10 using one of the hardware and the software, etc., is described above. However, the configuration is not limited to this but a part of the constituent elements of the locator 10 may be implemented by dedicated hardware, and another part of the constituent elements may be implemented by software, etc. For example, the processing circuit 50 functioning as the dedicated hardware can implement the functions of the part of the constituent elements, and the processing circuit 50 functioning as the processor 51 can implement the functions of the other part of the constituent elements through reading and executing a program stored in the memory 52.

As described above, the locator 10 can implement each of the functions by hardware, software, etc., or any combinations of these.

Embodiment 2

In the locator 10 according to Embodiment 1, the accuracy of the time of the GNSS data is important because it influences the accuracy of the modified amount ($\Delta C$) of autonomous navigation positioning that is calculated by the modified amount calculator 16. Embodiment 2 proposes the GNSS receiver 1 that enables the locator 10 to accurately record the time of the GNSS data.

As described above, the GNSS receiver 1 performs a decoding process for retrieving the GNSS data (raw data) from the satellite signal, and a positioning process using the GNSS data (GNSS positioning). Since the GNSS data is large in amount and requires a certain time for the positioning process, there is a time lag since the GNSS receiver 1 receives the satellite signal and outputs the GNSS data until the locator 10 obtains the GNSS data.

Figure 7:
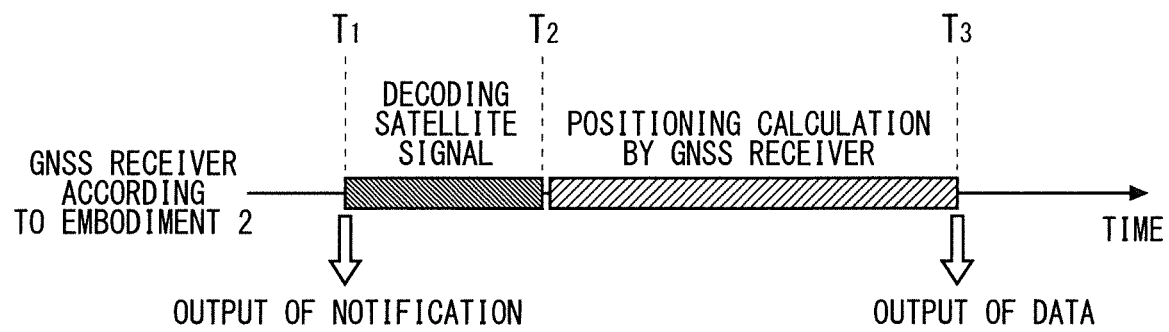
FIG. 7 illustrates operations of a GNSS receiver according to Embodiment 2.

According to Embodiment 2, the GNSS receiver 1 is configured to output a notification to the locator 10 at a time $T_1$ of receiving the satellite signal and starting to decode the satellite signal as illustrated in FIG. 7, or at a time $T_2$ of completion of the decoding of the satellite signal as illustrated in FIG. 8, prior to a time $T_3$ of outputting the GNSS data or data on a positioning result.

The GNSS data obtaining unit 11 of the locator 10 in Embodiment 2 records the time $T_1$ or $T_2$ at which the notification has been received from the GNSS receiver 1, and attaches a time stamp representing the time $T_1$ or $T_2$ to the GNSS data when obtaining the GNSS data at the time $T_3$. Since this increases the accuracy of the time of the GNSS data recognized by the locator 10 and the accuracy of the modified amount ($\Delta C$) of autonomous navigation positioning that is calculated by the modified amount calculator 16, the accuracy of the second autonomous navigation positioning fix (PD2) calculated by the autonomous navigation positioning fix modification unit 17, that is, the measurement result of the current position of the subject vehicle will be increased.

Figure 9:
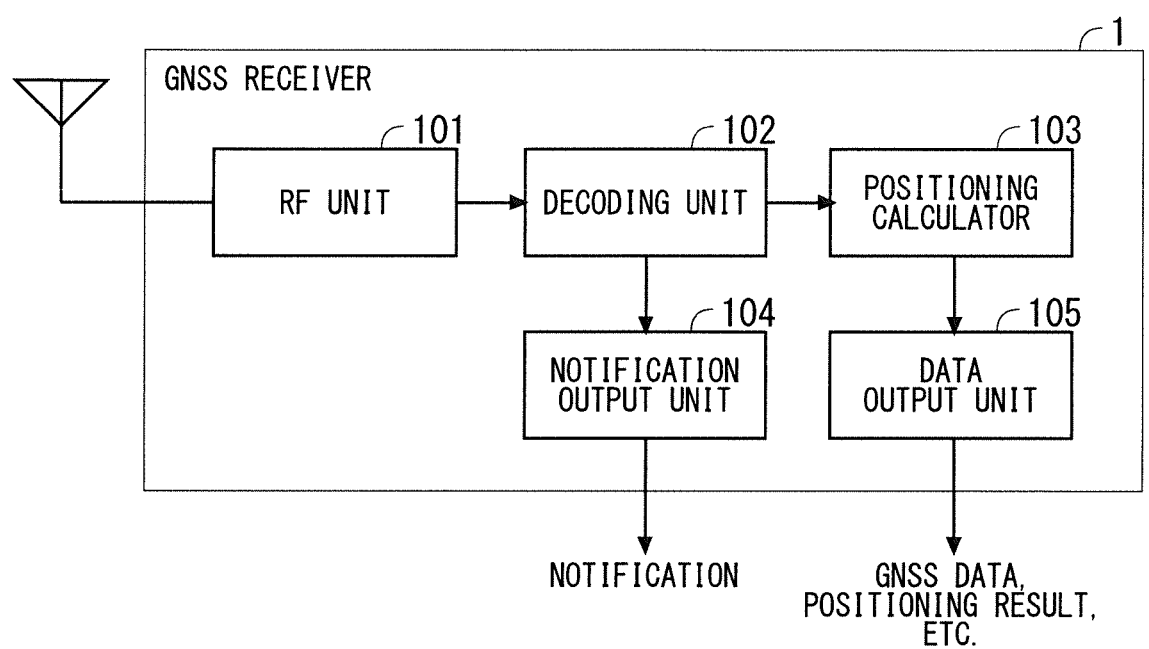
FIG. 9 illustrates a configuration of the GNSS receiver according to Embodiment 2.

FIG. 9 illustrates a configuration of the GNSS receiver 1 according to Embodiment 2. As illustrated in FIG. 9, the GNSS receiver 1 includes a radio frequency (RF) unit 101, a decoding unit 102, a positioning calculator 103, a notification output unit 104, and a data output unit 105.

The RF unit 101 performs a process of receiving a satellite signal transmitted from a GNSS satellite. The decoding unit 102 decodes the satellite signal to obtain the GNSS data (raw data) from the satellite signal. The positioning calculator 103 performs positioning calculation using the GNSS data obtained by the decoding unit 102 to perform the GNSS positioning for calculating the current position of the GNSS receiver 1. The notification output unit 104 outputs a notification to the locator 10 at the time $T_1$ when the decoding unit 102 starts to decode the satellite signal or at the time $T_2$ when the decoding unit 102 has completed the decoding. After the decoding unit 102 completes the decoding, specifically, at the time $T_3$ when the positioning calculator 103 has completed the GNSS positioning, the data output unit 105 outputs, to the locator 10, the GNSS data obtained by the decoding unit 102 or data on the positioning result of the positioning calculator 103.

The GNSS receiver 1 can be implemented by the hardware configuration illustrated in FIG. 5 or FIG. 6. For example, in the case where the GNSS receiver 1 is configured as illustrated in FIG. 5, the GNSS receiver 1 includes the processing circuit 50 for performing the process of receiving the satellite signal transmitted from the GNSS satellite, decoding the satellite signal to obtain the GNSS data, outputting a notification upon start of decoding the satellite signal or completion of the decoding, and outputting the GNSS data after completion of the decoding of the satellite signal.

In the case where the GNSS receiver 1 is configured as illustrated in FIG. 6, the GNSS receiver 1 includes the memory 52 for storing a program which, when executed by the processor 51, consequently executes the processes of: receiving the satellite signal transmitted from the GNSS satellite; decoding the satellite signal to obtain the GNSS data; outputting a notification upon start of decoding the satellite signal or completion of the decoding; and outputting the GNSS data after completion of the decoding of the satellite signal.

Embodiment 3

Figure 10:
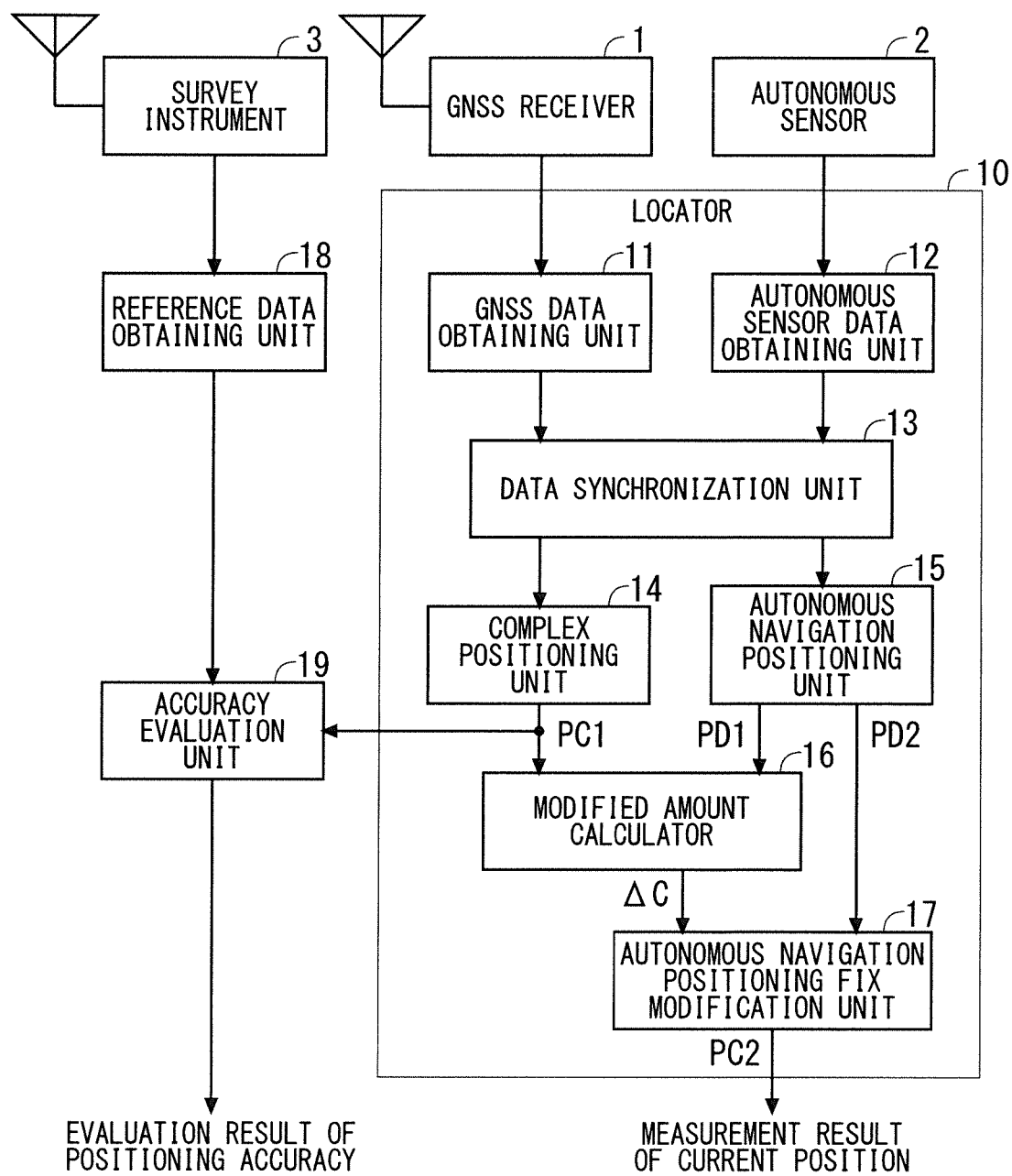
FIG. 10 illustrates a configuration of an accuracy evaluation system for a locator according to Embodiment 3.

FIG. 10 illustrates a configuration of an accuracy evaluation system for the locator 10 according to Embodiment 3. The configuration of the accuracy evaluation system in FIG. 10 is Obtained by further connecting a survey instrument 3, a reference data obtaining unit 18, and an accuracy evaluation unit 19 to the locator 10 in the configuration of FIG. 1. The locator 10 may include the reference data obtaining unit 18 and the accuracy evaluation unit 19.

The survey instrument 3 receives a satellite signal transmitted from a GNSS satellite, and performs positioning more accurately than the GNSS receiver 1, using the GNSS data (raw data) retrieved from the satellite signal. The positioning performed by the survey instrument 3 is not limited to the GNSS positioning. For example, when the survey instrument 3 includes an accurate autonomous sensor, the survey instrument 3 may perform the complex positioning using autonomous sensor data obtained by the autonomous sensor. Hereinafter, the position obtained as a positioning result of the survey instrument 3 will be referred to as an "accurate positioning fix".

The survey instrument 3 and the GNSS receiver 1 are different pieces of hardware. Since both of the survey instrument 3 and the GNSS receiver 1 perform positioning calculation using the GNSS data received from the same GNSS satellite, the time at the accurate positioning fix output by the survey instrument 3 basically synchronizes with the time of the GNSS data output by the GNSS receiver 1.

The reference data obtaining unit 18 obtains data on the accurate positioning fix from the survey instrument 3, and enters the data into the accuracy evaluation unit 19. The accuracy evaluation unit 19 obtains the first complex positioning fix (PC1) calculated by the complex positioning unit 14 of the locator 10, evaluates the accuracy of the first complex positioning fix by comparing the time of the first complex positioning fix with the accurate positioning fix identical in time to the first complex positioning fix, and outputs the evaluation result (e.g., an error of the first complex positioning fix with respect to the accurate positioning fix).

FIG. 11 is a flowchart for describing operations of the accuracy evaluation system for the locator 10 according to Embodiment 3. The procedure of FIG. 11 is obtained by adding Steps S110 and S111 to be described later, between Steps S103 and S104 in the procedure of FIG. 4. Since the other Steps are the same as those in the procedure of FIG. 4, only Steps S110 and S111 will be described herein. The reference data obtaining unit 18 obtains the data on the accurate positioning fix at any timing of outputting the accurate positioning fix from the survey instrument 3, which is not illustrated in the flowchart in FIG. 11.

In the accuracy evaluation system according to Embodiment 3, when the complex positioning unit 14 calculates the first complex positioning fix corresponding to the time of the latest GNSS data in Step S103, the accuracy evaluation unit 19 checks whether the reference data obtaining unit 18 obtains the accurate positioning fix identical in time to the latest GNSS data (Step S110).

When the reference data obtaining unit 18 obtains the accurate positioning fix identical time to the latest GNSS data (YES in Step S110), the accuracy evaluation unit 19 evaluates the accuracy of the first complex positioning fix by comparing the first complex positioning fix calculated in Step S103 with the accurate positioning fix identical in time to the first complex positioning fix (Step S111). When the reference data obtaining unit 18 does not obtain the accurate positioning fix identical in time to the latest GNSS data (NO in Step S110), Step S111 is not performed.

The evaluation system according to Embodiment 3 can evaluate the accuracy of the locator 10 with respect to the accurate positioning fix that is a positioning result of the survey instrument 3. Since both of the time at the first complex positioning fix calculated by the complex positioning unit 14 and the time at the accurate positioning fix calculated by the survey instrument 3 are based on the time of the GNSS data, the first complex positioning fix can be directly compared with the accurate positioning fix. Thus, the evaluation system has an advantage of evaluating the accuracy of the locator 10 without modifying the accurate positioning fix.

The result of the accuracy evaluated by the accuracy evaluation unit 19 can be used, for example, when a manufacturer of the locator 10 defines the specification of the locator 10, or for a test for checking whether each of the locators 10 satisfies the specification. When the accuracy decreases at a specific time or a specific position, the result can be used for identifying the corresponding portion and increasing the accuracy.

Embodiments according to the present invention can be freely combined, or appropriately modified and omitted within the scope of the invention.

While the present invention is described in detail above, the foregoing description is in all aspects illustrative and does not restrict the invention. It is understood that numerous modifications that have not yet been exemplified can be devised without departing from the scope of the invention.

EXPLANATION OF REFERENCE SIGNS

1 GNSS receiver, 2 autonomous sensor, 3 survey instrument, 10 locator, 11 GNSS data obtaining unit, 12 autonomous sensor data obtaining unit, 13 data synchronization unit, 14 complex positioning unit, 15 autonomous navigation positioning unit, 16 modified amount calculator, 17 autonomous navigation positioning fix modification unit, 18 reference data obtaining unit, 19 accuracy evaluation unit, 101 RF unit, 102 decoding unit, 103 positioning calculator, 104 notification output unit, 105 data output unit, DD autonomous sensor data, DG GNSS data, PC1 first complex positioning fix, PC2 second complex positioning fix, PD1 first autonomous navigation positioning fix, PD2 second autonomous navigation positioning fix, ΔC modified amount.

The invention claimed is:

1. A locator comprising:
a processor to execute a program; and
a memory to store the program which, when executed by the processor, performs processes of:
obtaining GNSS data from a GNSS receiver, the GNSS data being data received by the GNSS receiver from a GNSS satellite;
obtaining autonomous sensor data that is data output by an autonomous sensor;

calculating an interpolated value for the autonomous sensor data when the autonomous sensor data is obtained after the GNSS data is obtained, the interpolated value corresponding to a time of latest GNSS data;

performing complex positioning using the latest GNSS data and the interpolated value for the autonomous sensor data;

performing frst autonomous navigation positioning using the interpolated value for the autonomous sensor data, and performing second autonomous navigation positioning using latest autonomous sensor data;

calculating a modified amount of autonomous navigation positioning, based on a difference between a first complex positioning fix that is a result of the complex positioning and a first autonomous navigation positioning fix that is a result of the first autonomous navigation positioning; and modifying, using the modified amount, a second autonomous navigation positioning fix that is a result of the second autonomous navigation positioning to calculate a second complex positioning fix, and outputting the second complex positioning fix as a measurement result of a current position.

2. The locator according to claim 1,
wherein the complex positioning is tightly coupled complex positioning of calculating the first complex positioning fix directly from the GNSS data and the interpolated value for the autonomous sensor data.

3. The locator according to claim 1,
wherein the complex positioning is loosely coupled complex positioning of calculating the first complex positioning fix from a result of positioning calculation using the GNSS data and a result of positioning calculation using the interpolated value for the autonomous sensor data.

4. The locator according to claim 1,
wherein the time of the GNSS data is a time at which the GNSS receiver starts to decode a satellite signal received from the GNSS satellite or has completed the decoding.

5. A locator comprising:
a processor to execute a program;
a memory to store the program which, when executed by the processor, performs processes of:
  obtaining GNSS data from a G\SS receiver, the GNSS data being data received by the GNSS receiver from a GNSS satellite;
  obtaining autonomous sensor data that is data output by an autonomous sensor;
  calculating an interpolated value for the autonomous sensor data when the autonomous sensor data is obtained after the GNSS data is obtained, the interpolated value corresponding to a time of latest GNSS data;
  performing complex positioning using the latest GNSS data and the interpolated value for the autonomous sensor data;
  performing first autonomous navigation positioning using the interpolated value for the autonomous sensor data, and performing second autonomous navigation positioning using latest autonomous sensor data;
  calculating a modified amount of autonomous navigation positioning, based on a difference between a first complex positioning fix that is a result of the complex positioning and a first autonomous navigation positioning fix that is a result of the first autonomous navigation positioning; and
  modifying using the modified amount, a second autonomous navigation positioning fix that is a result of the second autonomous navigation positioning to calculate a second complex positioning fix, and outputting the second complex positioning fix as a measurement result of a current position; and an accuracy evaluation system configured to:
  obtain data on an accurate positioning fix that is a positioning result, from a survey instrument that performs positioning using data received from the GNSS satellite, and
  evaluate accuracy of the first complex positioning fix by comparing the first complex positioning fix with the accurate positioning fix identical in time to the first complex positioning fix.

6. A positioning method comprising:
obtaining GNSS data from a GNSS receiver, the GNSS data being data received by the GNSS receiver from a GNSS satellite;
obtaining autonomous sensor data that is data output by an autonomous sensor;
calculating an interpolated value for the autonomous sensor data when the autonomous sensor data is obtained after the GNSS data is obtained, the interpolated value corresponding to a time of latest GNSS data;
performing complex positioning using the latest GNSS data and the interpolated value for the autonomous sensor data;
performing first autonomous navigation positioning using the interpolated value for the autonomous sensor data, and performing second autonomous navigation positioning using latest autonomous sensor data;
calculating a modified amount of autonomous navigation positioning, based on a difference between a first complex positioning fix that is a result of the complex positioning and a first autonomous navigation positioning fix that is a result of the first autonomous navigation positioning; and
modifying, using the modified amount, a second autonomous navigation positioning fix that is a result of the second autonomous navigation positioning to calculate a second complex positioning fix, and outputting the second complex positioning fix as a measurement result of a current position.

* * * * *